United States Patent [19]
Baetz

[11] 3,888,983
[45] June 10, 1975

[54] DERIVATIVES OF THIAZOLINO-PYRIMIDIN-6-ONES, IN INDUCING ANALGESIA

[75] Inventor: Jacques L. E. Baetz, La Garenne-Colombes, France

[73] Assignee: Seperic, Morat, Switzerland

[22] Filed: June 15, 1973

[21] Appl. No.: 370,233

Related U.S. Application Data

[60] Division of Ser. No. 222,291, March 8, 1972, abandoned, which is a continuation-in-part of Ser. No. 168,212, Aug. 2, 1971, abandoned.

[30] Foreign Application Priority Data

Aug. 14, 1970 United Kingdom............ 168,212/70

[52] U.S. Cl........ 424/251; 260/251 A; 260/256.5 R

[51] Int. Cl............................................ A61k 27/00
[58] Field of Search... 424/251; 260/251 A, 256.5 R

[56] References Cited
OTHER PUBLICATIONS

Falch et al., Acta. Chem. Scand., 24, (4), 1970, pp. 1423, 1427 and 1429.

Primary Examiner—Stanley J. Friedman
Attorney, Agent, or Firm—Young & Thompson

[57] ABSTRACT

Thiazolino-pyrimidin-5-ones optionally substituted with an alkyl group at each of 2-, 3- and 6-positions and substituted at 7-position with an aryl, aralkyl, heterocyclic, cycloalkyl, trifluoromethyl or alkyl group, have been found useful as analgesics.

15 Claims, 2 Drawing Figures

DERIVATIVES OF THIAZOLINO-PYRIMIDIN-6-ONES, IN INDUCING ANALGESIA

This application is a division of my copending application Ser. No. 222,291, filed Mar. 8, 1972 and now abandoned, which was a continuation-in-part of my then copending application Ser. No. 168,212, filed Aug. 2, 1971 and now abandoned.

This invention relates to a family of new chemical compounds, endowed with therapeutical, particularly analgesic, properties.

Figure 1:
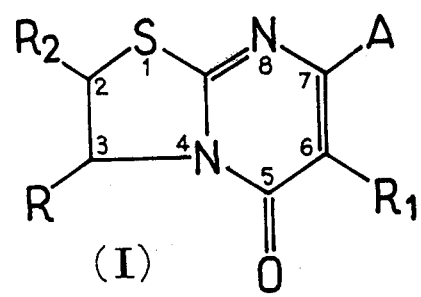

The compounds (I) contemplated by the invention are those of the general formula illustrated in FIG. 1 of the accompanying drawing, in which:

$R$, $R_1$ and $R_2$ are each hydrogen or an alkyl group, and
A is:
  a phenyl group optionally substituted with halogens, alkyl, alkoxy or trifluoromethyl groups, or
  a thienyl, furyl, pyridyl, cycloalkyl, phenylalkyl, trifluoromethyl or alkyl group, and their acid addition salts, particularly with pharmaceutically acceptable acids.

Thus, compounds (I) are 7- and/or 2- and/or 3- and/or 6-substituted thiazolino-pyrimidin-5-ones; advantageously, one at most of positions 2-, 3- or 6- is substituted in addition to position 7-. It should be noted that when a substituent is present at 2- and/or 3-position, compounds (5) may exist in the form of stereoisomers and the invention includes both the racemic forms and the optically active forms.

In the preceding definition, the alkyl and alkoxy groups are advantageously lower groups from each of these series, in particular groups containing from 1 to 4 carbon atoms.

Figure 2:
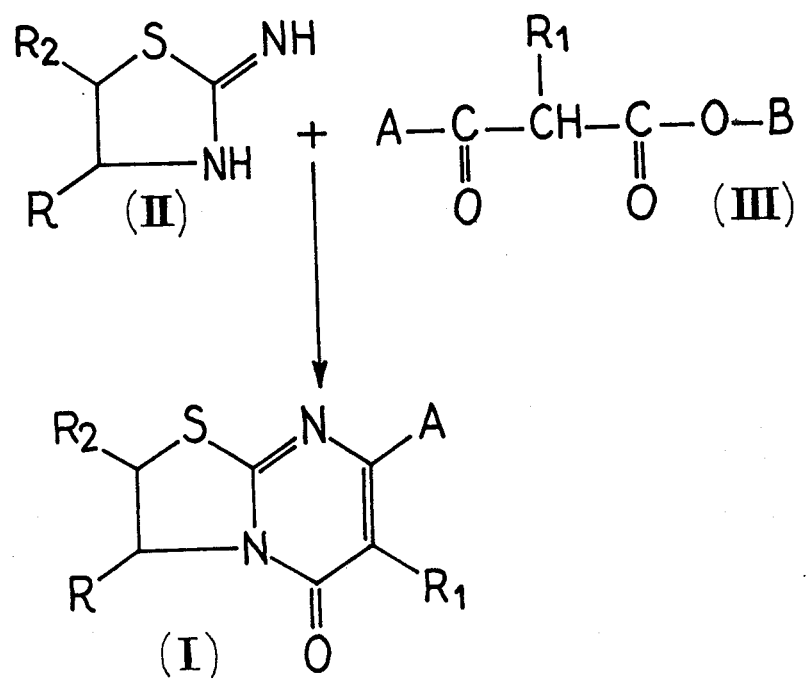

To prepare compounds (I), a process illustrated in FIG. 2 of the accompanying drawing, and which is also included within the scope of the invention, may be used.

This process comprises condensing a 2-iminothiazolidine (II) of the formula:

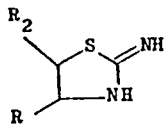

in which R and $R_2$ have the above-defined meanings, with a β-carbonyl ester (III) of the formula:

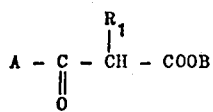

in which:
  $R_1$ and A have the above-defined meanings, and
  B is a lower alkyl residue, and then optionally salifying resulting compound (I).

Imino-thiazolidine (II) may be used in free or salt form. In the latter case, the imine is released in situ by an alkaline compound.

This condensation is advantageously conducted within an organic solvent such as toluene, xylene or dioxan. It is promoted by heating, for example at the refluxing temperature of the solvent. The condensation may also be carried out without a solvent, by heating the mixture to 140°–160°C.

The following examples illustrate the invention without, however, limiting same.

EXAMPLE I

Synthesis of 7-phenyl-2,3-dihydro-thiazolo(3.2.a)-pyrimidin-5-one (Formula I: $A = C_6H_5$, $R = R_1 = R_2 = H$; Code No.: 540).

Into a 1 litre flask fitted with a stirring system, a cooler and a heating device, are added 100 g 2-iminothiazolidine (II, $R = R_2 = H$) and 300 ml xylene. The mixture is heated until it is dissolved, and 190 g ethyl benzoyl acetate (III: $A = C_6H_5$, $R_1 = H$, $B = C_2H_5$) are then added thereto.

After refluxing during 5 hours, the reaction mixture is left aside overnight at room temperature. The resulting crystalline material is suction filtered, washed with ethanol and then recrystallized from ethyl ether, after which it is dried in vacuo, to give 50.7 g of product, m.p. = 166°–167°C.

Analysis: Total nitrogen

| | |
|---|---|
| Calculated | 12.16% |
| Found | 12.26% |

The resulting 7-phenyl-2,3-dihydro-thiazolo(3.2.a)-pyrimidin-5-one base may be converted to the hydrochloride, as follows:

20 g 7-phenyl-2,3-dihydro-thiazolo(3.2.a)pyrimidin-5-one are dissolved in 130 ml chloroform, at room temperature. 40 ml of 6N hydrochloric acid in ethanol solution are then added with stirring. The mixture rapidly sets to a mass. It is left aside during one hour at room temperature, and then one hour in an ice-bath. It is then suction filtered, washed once with chloroform and then twice with absolute ethanol, after which it is dried in an oven at 40°C, to give 22 g of 7-phenyl-2,3-dihydro-thiazolo(3.2.a)pyrimidin-5-one hydrochloride, m.p. = 198°C.

| Analysis: | Calculated | Found |
|---|---|---|
| Total nitrogen | 10.50% | 10.31% |
| Ionized chlorine | 13.29% | 13.45% |

EXAMPLE II

Alternative synthesis of 7-phenyl-2,3-dihydro-thiazolo(3.2.a)-pyrimidin-5-one (Formula I: $A = C_6H_5$, $R = R_1 = R_2 = H$; Code No.: 540)

Imino thiazolidine (0.02 mole) is dissolved in ethyl benzoyl acetate (0.04 mole), with warming. The reaction mixture is then flame-heated to incipient boiling which is maintained for a few minutes. The resulting orange solution is poured over 50 g water-ice mixture. It is then stirred during 15 minutes. A yellow product precipitates out. It is filtered and washed with water. The insoluble is taken up into an ethanol-water mixture, filtered, washed with ether and dried in vacuo, to give 1.7 g of crystalline product, m.p. = 166°C (no depression on admixture with the product obtained according to the procedure of Example I).

| Analysis: | Calculated | Found |
|---|---|---|
| Basic nitrogen | 6.08% | 5.95% |

EXAMPLE III

Preparation of 7-(m-trifluoromethyl-phenyl)-2,3-dihydrothiazolo(3.2.a)pyrimidin-5-one (Formula I: $A = m\text{-}CF_3\text{—}C_6H_4$, $R = R_1 = R_2 = H$; Code No.: 672).

2-Imino-thiazolidine (5 g) and ethyl m-trifluoromethylbenzoyl acetate (III: $A = m\text{—}CF_3\text{—}C_6H_4$, $R_1 = H$, $B = C_2H_5$; 12 g) are mixed with xylene (20 ml). The reaction mixture is refluxed during 7 hours. After allowing to rest overnight at room temperature, a crude material is collected and is then recrystallized from chloroform (20 ml), to give 3.2 g of product, m.p. = 164°C.

| Analysis: | Calculated | Found |
|---|---|---|
| Total nitrogen | 9.39% | 9.38% |

EXAMPLE IV

Preparation of 3-methyl-7-phenyl-2,3-dihydro-thiazolo(3.2.a)pyrimidin-5-one (Formula I: $A = C_6H_5$, $R = CH_3$, $R_1 = R_2 = H$; Code No.: 682).

To a flask are added 2-imino-4-methyl-thiazolidine (II : $R = CH_3$, $R_2 = H$; 0.2 mole) and ethyl benzoylacetate (III: $A = C_6H_5$, $R_1 = H$, $B = C_2H_5$; 0.2 mole) which are dissolved in toluene. The mixture is refluxed, with stirring, during 6 hours and is then left aside overnight at room temperature. The resulting material is washed three times with ethanol, suction filtered and then recrystallized from 100 ml chloroform, to give 16 g of product, m.p. 117°–119°C.

| Analysis: | Calculated | Found |
|---|---|---|
| Total nitrogen | 11.46% | 11.35% |

EXAMPLE V

Preparation of 7-(3′,4′-dichloro-phenyl)-2,3-dihydro-thiazolo-(3.2.a)-pyrimidin-5-one (Formula I: $A = 3',4'\text{—}Cl_2\text{—}C_6H_3$; $R = R_1 = R_2 = H$. Code No.: 668).

2-Imino-thiazolidine (13.5 g) and ethyl 3′,4′-dichlorobenzoylacetate (34.3 g) (III: $A = 3', 4'\text{—}Cl_2\text{—}C_6H_3$; $R_1 = H$; $B = C_2H_5$) are mixed with 60 ml xylene and are then refluxed during 7 hours. After resting overnight at room temperature, the resulting crystals are suction filtered, washed with xylene and with ethanol. On recrystallization from chloroform, 11.8 g of product, m.p. = 183°C, are collected.

| Analysis: | Calculated | Found |
|---|---|---|
| Total nitrogen | 9.36% | 9.33% |

The constitution and physical properties of compounds (I) obtained according to the examples described above and of other compounds (I) prepared in a similar manner are summarized in the following Table. In this Table are also reported data relating to the analgesic activity of compounds (I), as determined by one of the conventional testing procedures for this activity, the "writhing test".

Mice are given a single intraperitoneal injection of 0.2 ml of 6 °/oo acetic acid. The compound (I) to be tested is administered orally at a dosage of 10–60 mg/kg, one half-hour prior to the acetic acid injection. The number of characteistic writhing movements induced by pain is counted during the 15 minutes that follow the acetic acid injection.

The magnitude of the action of each compound described is expressed using one to four +'s, four +'s representing maximum activity.

| Code N°. | A | R | $R_1$ | $R_2$ | M.P.(tube), °C | Activity |
|---|---|---|---|---|---|---|
| 540 | —$C_6H_5$ | H | H | H | 166–167° | ++++ |
| 548 | —$CH_3$ | H | H | H | 126–128° | ++++ |
| 635 | -2′-thienyl- | H | H | H | 214–215° | ++ |
| 658 | —$C_6H_4$—Br (p) | H | H | H | 245° | + |
| 659 | -2′-furyl | H | H | H | 199–200° | ++ |
| 664 | —$C_6H_4$—Cl (p) | H | H | H | 210° | + |
| 672 | —$C_6H_4$—$CF_3$ (m) | H | H | H | 164° | +++ |
| 678 | —$C_6H_4$—Cl (m) | H | H | H | 165° | +++ |
| 682 | —$C_6H_5$ | $CH_3$ | H | H | 117–119° | ++++ |
| 686 | —$C_6H_4$—$CH_3$ (m) | H | H | H | 142° | +++ |
| 688 | —$C_6H_3$—$Cl_2$(3′4′) | H | H | H | 183° | + |
| 691 | $C_6H_4$—Cl (o) | H | H | H | 159–160° | + |
| 693 | —$C_6H_4$—$OCH_3$ (m) | H | H | H | 151° | ++ |
| 698 | 3′-pyridyl | H | H | H | 185–187° | ++ |
| 700 | —$C_6H_5$ | H | $CH_3$ | H | 163° | ++ |
| 703 | —$C_6H_5$ | $C_2H_5$ | H | H | 126–128° | +++ |
| 721 | cyclohexyl | H | H | H | 114° | +++ |
| 722 | —$C_6H_2(OCH_3)_3$(3′4′5′) | H | H | H | 223° | ++ |
| 757 | —$C_6H_4$—Br (m) | H | H | H | 155–156° | ++ |
| 816 | $CF_3$ | H | H | H | 68–70° | ++++ |
| 822 | n—$C_3H_7$ | H | H | H | 94° | ++ |
| 823 | —$C_6H_5$ | H | H | $CH_3$ | 171–173° | +++ |
| 824 | —$CH_2$—$C_6H_5$ | H | H | H | 114–115° | ++ |
| 850 | —$(CH_2)_4$—$CH_3$ | H | H | H | 68–69° | ++ |
| 852 | —$CH_2$—$CH_2$—$C_6H_5$ | H | H | H | 95° | ++ |
| 859 | —$CH_2$—$CH_3$ | H | H | H | 104° | +++ |
| 860 | cyclopropyl | H | H | H | 126° | +++ |
| 878 | —$CH_3$ | $CH_3$ | H | H | 111° | ++++ |
| 897 | —$CH_2$—$C_6H_5$ | $CH_3$ | H | H | 88–94° | +++ |

The analgesic activity of compounds (I) permits their application in human medicine, said compounds being administrable by the oral, parenteral or rectal route at a daily dosage regimen generally comprised between 300 and 900 mg.

For such administration, the compounds (I) are formulated as therapeutic compositions with the vehicles or excipients suitable for these various routes of administration. The compositions, formulated in unit dosage form, such as tablets, suppositories and empoules, contain preferably from 100 to 300 mg of compound (I).

Having now described my invention, what I claim and desire to secure by letters Patent is:

1. A method of inducing analgesia in a patient comprising administering to said patient by any of the oral, parenteral and rectal routes, a quantity of from 100 to 300 mg of an active principle selected from a thiazolino-pyrimidin-5-one compound of the formula

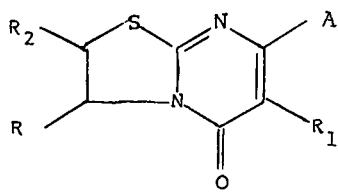

in which:

R, $R_1$ and $R_2$ are each selected from hydrogen and the (1-4C) alkyl groups, and A is selected from (a) the phenyl group, and the phenyl group substituted with halogen, (1-4C) alkyl, (1-4C) alkoxy and trifluoromethyl groups, and (b) cycloalkyl having up to 6 C-phenyl-(1-4C) alkyl, trifluoromethyl and (1-4C) alkyl groups, and a pharmaceutically acceptable acid addition salt thereof.

2. A method as claimed in claim 1, wherein 300 to 900 mg of active principle are administered per day to said patient.

3. A method as claimed in claim 1, wherein one at most of substituents R, $R_1$ and $R_2$ of said compounds is other than hydrogen.

4. A method as claimed in claim 1, wherein said compound is 7-phenyl-2,3-dihydro-thiazolo (3.2.a) -pyrimidin-5-one.

5. A method as claimed in claim 1, wherein said compound is 7-m-trifluoromethylphenyl-2,3-dihydro-thiazolo (3.2.a)-pyrimidin-5-one.

6. A method as claimed in claim 1, wherein said compound is 3-methyl-7-phenyl-2,3-dihydro-thiazolo(3.2.a)-pyrimidin-5-one.

7. A method as claimed in claim 1, wherein said compound is 7-cyclohexyl-2,3-dihydro-thiazolo(3.2.a)-pyrimidin-5-one.

8. A method as claimed in claim 1, wherein said compound is 7-trifluoromethyl-2,3-dihydro-thiazolo(3.2.a)-pyrimidin-5-one.

9. A method as claimed in claim 1, wherein said compound is 7-methyl-2,3-dihydro-thiazolo(3.2.a)-pyrimidin-5-one.

10. A method as claimed in claim 1, wherein said compound is 7-n-pentyl-2,3-dihydro-thiazolo(3.2.a)-pyrimidin-5-one.

11. A method as claimed in claim 1, wherein said compound is 7-phenethyl-2,3-dihydro-thiazolo(3.2.a)-pyrimidin-5-one.

12. A method as claimed in claim 1, wherein said compound is 7-ethyl-2,3-dihydro-thiazolo(3.2.a)-pyrimidin-5-one.

13. A method as claimed in claim 1, wherein said compound is 7-cyclopropyl-2,3-dihydro-thiazolo(3.2.a)-pyrimidin-5-one.

14. A method as claimed in claim 1, wherein said compound is 3,7-dimethyl-2,3-dihydro-thiazolo(3.2.a)-pyrimidin-5-one.

15. A method as claimed in claim 1, wherein said compound is 3-methyl-7-benzyl-2,3-dihydro-thiazolo(3.2.a)-pyrimidin-5-one.

* * * * *